United States Patent
Noda et al.

(10) Patent No.: US 6,905,270 B2
(45) Date of Patent: Jun. 14, 2005

(54) DISCHARGING ROLLER, METHOD OF MANUFACTURING THE SAME, AND RECORDING APPARATUS INCORPORATING THE SAME

(75) Inventors: Satoshi Noda, Nagano (JP); Takao Kanzawa, Nagano (JP); Hiroshi Hamakawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/878,251

(22) Filed: Jun. 29, 2004

(65) Prior Publication Data

US 2004/0234317 A1 Nov. 25, 2004

Related U.S. Application Data

(62) Division of application No. 10/388,177, filed on Mar. 14, 2003.

(30) Foreign Application Priority Data

Mar. 14, 2002 (JP) .................................. P2002-069554
Mar. 7, 2003 (JP) .................................. P2003-061845

(51) Int. Cl.⁷ ................................................. B41J 13/02
(52) U.S. Cl. ....................... 400/634; 101/375; 425/542; 425/547
(58) Field of Search .......................... 400/634; 101/375, 101/376; 425/542, 546, 547, 552, 588

(56) References Cited

U.S. PATENT DOCUMENTS

| | | | | |
|---|---|---|---|---|
| 4,197,798 A | * | 4/1980 | Bardin | 101/153 |
| 4,204,594 A | * | 5/1980 | Banno | 198/827 |
| 5,773,109 A | | 6/1998 | Kubo et al. | |
| 6,129,301 A | * | 10/2000 | Stanley et al. | 242/340 |
| 6,143,385 A | | 11/2000 | Furuya et al. | |
| 6,197,437 B1 | * | 3/2001 | Bielec et al. | 428/627 |
| 6,241,619 B1 | | 6/2001 | Russell | |
| 6,615,006 B2 | * | 9/2003 | Michlin et al. | 399/90 |
| 6,776,953 B1 | * | 8/2004 | Hulsberg et al. | 264/570 |

FOREIGN PATENT DOCUMENTS

| | | |
|---|---|---|
| DE | 38 35 964 A1 | 4/1990 |
| JP | 10-129910 | 5/1998 |
| JP | 10-291674 | 11/1998 |

* cited by examiner

Primary Examiner—Eugene H. Eickholt
(74) Attorney, Agent, or Firm—Sughrue Mion, PLLC

(57) ABSTRACT

In order to manufacture a discharging roller which discharges a recording medium from a recording apparatus, there are a first die formed with a first recess extending in an axial direction of a shaft portion of the discharging roller, and a second die formed with a second recess extending in the axial direction. The first die and the second die are combined such that the first recess and the second recess face to form a continuous cavity. Synthetic resin is injected into the cavity to mold a bore portion of the shaft portion.

6 Claims, 12 Drawing Sheets

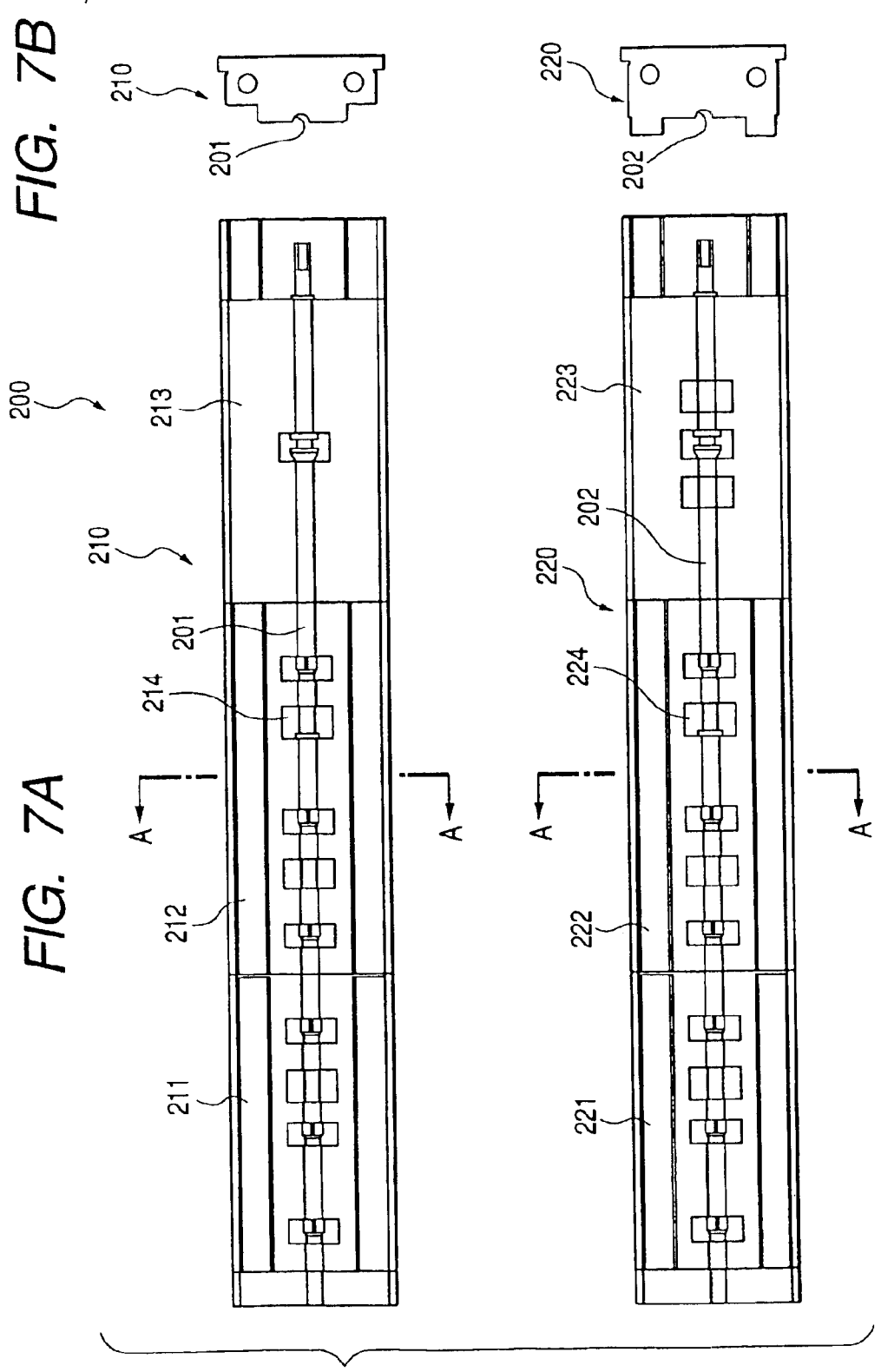

US 6,905,270 B2

DISCHARGING ROLLER, METHOD OF MANUFACTURING THE SAME, AND RECORDING APPARATUS INCORPORATING THE SAME

This is a divisional of application Ser. No. 10/388,177 filed Mar. 14, 2003; the disclosure of which is incorporated herein by reference.

BACKGROUND OF THE INVENTION

The present invention relates to a discharging roller which discharges a recording medium on which data recording has been performed, a method of manufacturing the discharging roller, and a recording apparatus incorporating the discharging roller.

An ink jet printer that is one of recording apparatuses is generally constituted so as to supply a sheet stored in a sheet feeding tray to a sheet feeding roller, transport the supplied sheet to a recording section while holding between a sheet feeding roller pair, cause a recording head to eject an ink droplet onto the sheet to perform recording, and discharge the sheet to a sheet ejection tray while holding between a discharging roller pair. Since recording on the sheet is thus performed between the discharging roller pair and the feeding roller pair, a rotary speed of the discharging roller is set slight higher than that of the feeding roller to tense the sheet between the discharging roller and the feeding roller, whereby the sheet becomes flat to improve recording accuracy.

FIG. 13A is a perspective view showing a first related-art discharging roller as disclosed in Japanese Patent Publication No. 10-129910A. This discharging roller 1 is formed so that a shaft portion 2 made of plastics becomes longer than at least recordable maximum sheet width, and plural roller portions 3 made of rubber are fitted in the shaft portion 2 with constant intervals. As shown in FIG. 13B, such the discharging roller 1 is formed so that a circular portion of a sectional shape of the shaft portion 2 has diameter Ds and a cross-shaped portion thereof has thickness t, and the diameter Ds must be smaller than diameter Dr of the roller portion 3. Specifically, the diameter Ds is 6.80 mm and the diameter Dr is 11.26 mm. Therefore, the proportion of the outer diameter of the shaft portion to the outer diameter of the roller portion is 60.4%.

FIG. 14 is a section view showing a second related-art discharging roller as disclosed in Japanese Patent Publication No. 10-291674A. This discharging roller comprises a cylindrical body 30 and shaft portions 20 extended from both longitudinal ends of the cylindrical body 30 and having a smaller diameter than that of the cylindrical body 30. The cylindrical body 30 and the shaft portions 20 are made of plastics. The shaft portions respectively have a hollowed portion which are formed by a core 75 or a resin injection port 77. One of the hollowed portion is communicated with a cavity 31 formed inside the cylindrical body 30.

In case that the first related-art discharging roller 1 is formed of synthetic resin, it is necessary to provide thickness deletion (thick removal) so as not to make the discharging roller thick in order to prevent deformation or sink of the shaft caused by internal stress in molding. Therefore, only rigidity of a certain level can be secured. Further, since the rotation speed of the discharging roller 1 is set so as to become higher than that of the feeding roller, power pulled onto the feeding roller side acts on the discharging roller. Therefore, there is anxiety that deformation such as a flexure is produced in the discharging roller 1.

Since the deformation of the discharge roll 1 such as the flexure is restored when a rear end of the sheet is released from the feeding roller pair, there are instances where a so-called flip phenomenon of sheet is produced at this time. In case that an ink jet printer can record data on the whole surface of sheet or the nearly whole surface thereof, recording is continued to the rear end of the sheet even after the rear end of the sheet is released from the feeding roller pair. Therefore, in case that the above flip phenomenon is produced, a bad influence is exerted on recording accuracy.

Regarding the second related-art discharging roller shown in FIG. 14, the sink 34 tends to be produced when auxiliary cavities 40 are filled with the injected resin. This causes deformation or the rigidity reduction of the discharging roller surface. Moreover, if flashes are formed on an outer circumferential surface of the shaft portions 20 and the cylindrical body 30 at the plastic molding process performed by the gas injection method, for example, there is anxiety that the flashes cause sliding load increase of a bearing portion or deterioration of sheet feeding accuracy.

SUMMARY OF THE INVENTION

It is therefore an object of the invention to provide a discharging roller which can prevent the flip phenomenon at the discharging time of a recording medium, a method of manufacturing such a discharging roller, and a recording apparatus incorporating such a discharging roller.

In order to achieve the above object, according to the invention, there is provided a discharging roller which discharges a recording medium from a recording apparatus, comprising a hollowed shaft portion comprised of synthetic resin.

Preferably, the synthetic resin is comprised of an additive to enhance stiffness of the shaft portion.

Preferably, the discharging roller further comprises a roller portion formed on an outer periphery of the shaft portion. Here, a proportion of an outer diameter of the shaft portion with respect to an outer diameter of the roller portion is not less than 60.5%.

According to the invention, there is also provided a die for molding a discharging roller which discharges a recording medium from a recording apparatus, the die comprising:

a first die, formed with a first recess extending in an axial direction of a shaft portion of the discharging roller; and a second die, formed with a second recess extending in the axial direction, the second die combined with the first die such that the first recess and the second recess face to form a continuous cavity for molding a bore portion of the shaft portion.

Preferably, the first recess is formed on a bottom face of a recessed portion of the first die, and the second recess is formed on a convex portion of the second die which is fitted into the recessed portion.

Here, it is preferable that an entrance corner of the recessed portion and a corner portion opposing to the entrance corner are tapered.

Preferably, at least one of the first die and the second die is formed with a fluid passage through which a fluid for cooling the cavity flows.

According to the invention, there is also provided a method of manufacturing a discharging roller which discharges a recording medium from a recording apparatus, the method comprising steps of:

providing a first die, formed with a first recess extending in an axial direction of a shaft portion of the discharging roller;

providing a second die, formed with a second recess extending in the axial direction;

combining the first die and the second die such that the first recess and the second recess face to form a continuous cavity; and injecting synthetic resin into the cavity to mold a bore portion of the shaft portion.

Preferably, the manufacturing method further comprises a step of regulating temperature of the cavity such an extent that the injected synthetic resin is solidified in a state where it is adhered onto an inner face of the cavity.

Preferably, the manufacturing method further comprises a step of injecting gas into the cavity to form a void in the injected synthetic resin in the cavity.

Since the discharging roller molded by the above die or manufactured by the above method has enhanced flexural rigidity, even if force in the opposite direction to the discharging direction is applied onto the discharging roller, the deformation of the discharging roller such as a flexure can be suppressed. Accordingly, the flip phenomenon of the recording medium due to the discharging roller can be prevented, and particularly recording accuracy in recording on the whole surface can be improved.

According to the invention, there is also provided a recording apparatus comprising the above discharging roller.

BRIEF DESCRIPTION OF THE DRAWINGS

The above objects and advantages of the present invention will become more apparent by describing in detail preferred exemplary embodiments thereof with reference to the accompanying drawings, wherein:

FIG. 7A is a plan view of the upper die and the lower die;

FIG. 7B is a section view taken along the line A—A in FIG. 7A;

DETAILED DESCRIPTION OF THE PREFERRED EMBODIMENTS

Preferred embodiments of the invention will be described below in detail with reference to accompanying drawings.

Figure 1:
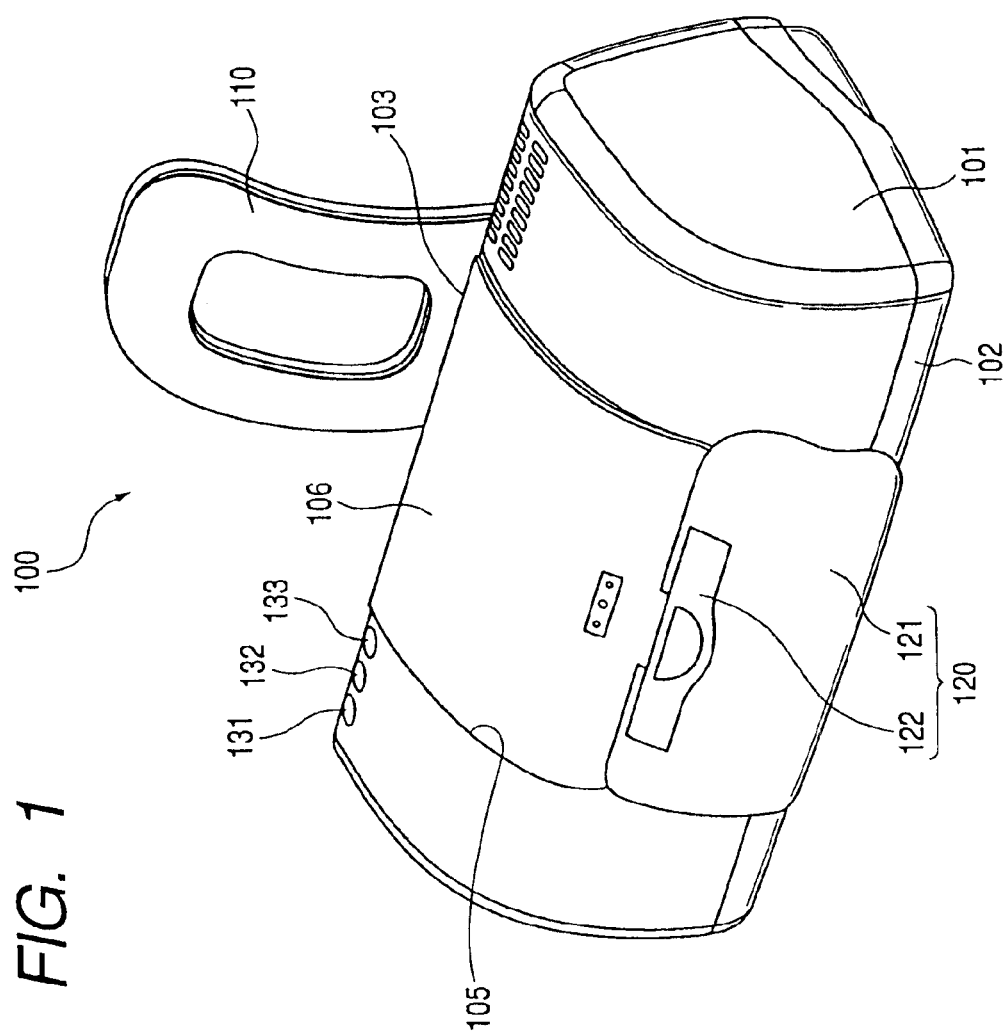
FIG. 1 is a perspective view of the whole of the exterior structure of an ink jet printer, in a state where a sheet ejection port is closed.
Figure 2:
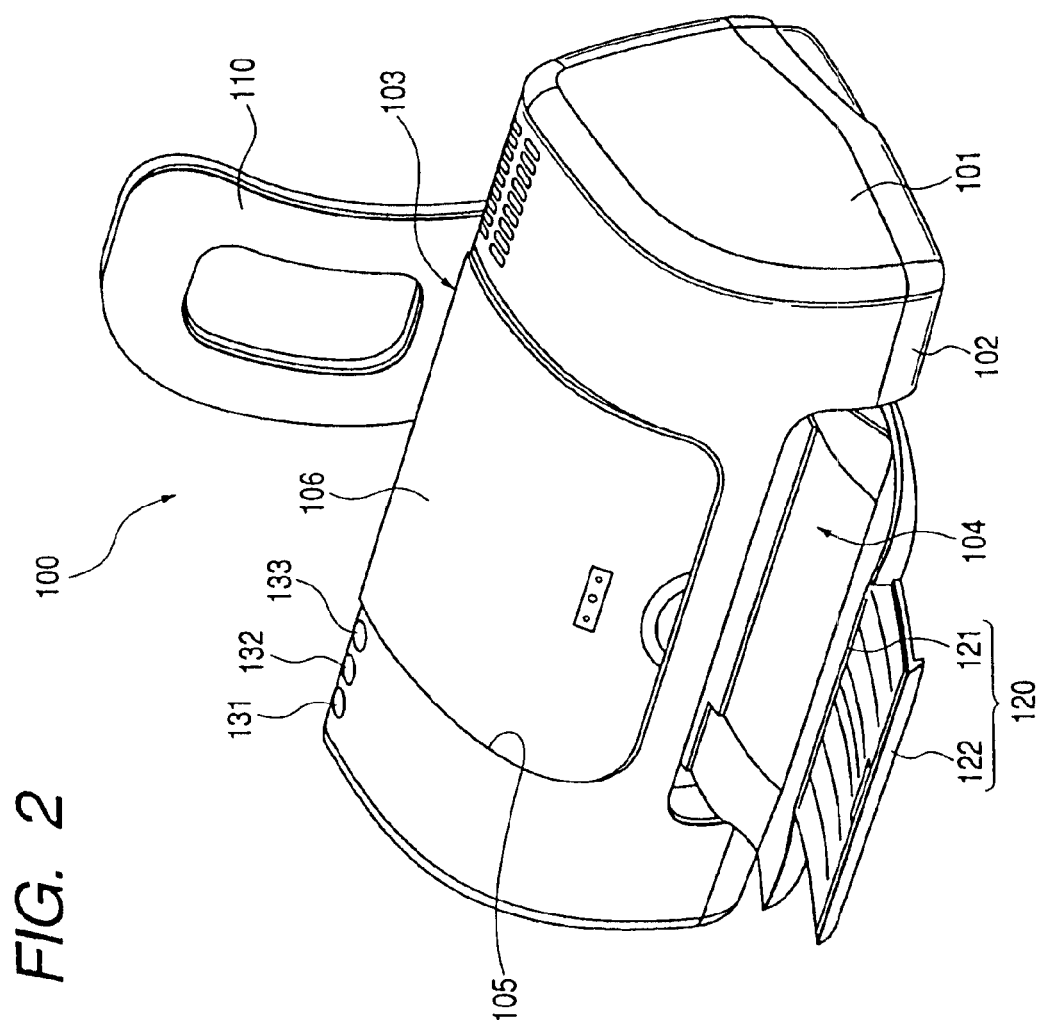
FIG. 2 is a perspective view of the ink jet printer, in a state where the sheet ejection port is opened.

As shown in FIGS. 1 and 2, an ink jet printer 100 which is one of recording apparatuses comprises an upper housing 101 and a lower housing 102. The upper housing 101 and the lower housing 102 are engaged with each other by snap fitting.

On the rear side of the upper housing 101, a sheet feeding port 103 is formed. In this sheet feeding port 103, a sheet feeding tray 110 on which sheets to be supplied are stacked is attached. The sheet feeding tray 110 is attached so as to protrude to the diagonally upper backside, and holds the sheets in a slanting state. On the front side of the upper housing 101, a sheet ejection port 104 is formed. On the front sides of the upper housing 101 and lower housing 102, a stacker 120 on which the ejected sheets are stacked is provided.

The stacker 120 is attached to the front sides of the upper housing 101 and lower housing 102 pivotably about a rotary shaft located at its lower portion. When the stacker 120 is not used, it is pivoted upward to close the sheet ejection port 104. When it is used, it is pivoted downward to open the sheet ejection port 104, and stops at a position where it protrudes from the lower housing 102 to the diagonally upper front side to receive the sheet in the slanting state. This stacker 120 has two-stage structure comprising a first stacker member 121 and a second stacker member 122 which is slidably attached to the first stacker member 121 at a distal end portion thereof. The second stacker member 122 is housed in the first stacker member 121 when it is not used, and pulled out from the first stacker member 121 when it is used.

A window 105 is formed from the upper portion of the upper housing 101 to the front surface thereof. This window 105 is covered with a transparent or semitransparent openable cover 106. By opening this cover 106, an exchanging work of ink cartridge and a maintenance work of the internal mechanism can be readily performed. Further, a push button type of power switch 131 and operational switches 132, 133 are provided on the left backside of the upper housing 101.

Figure 3:
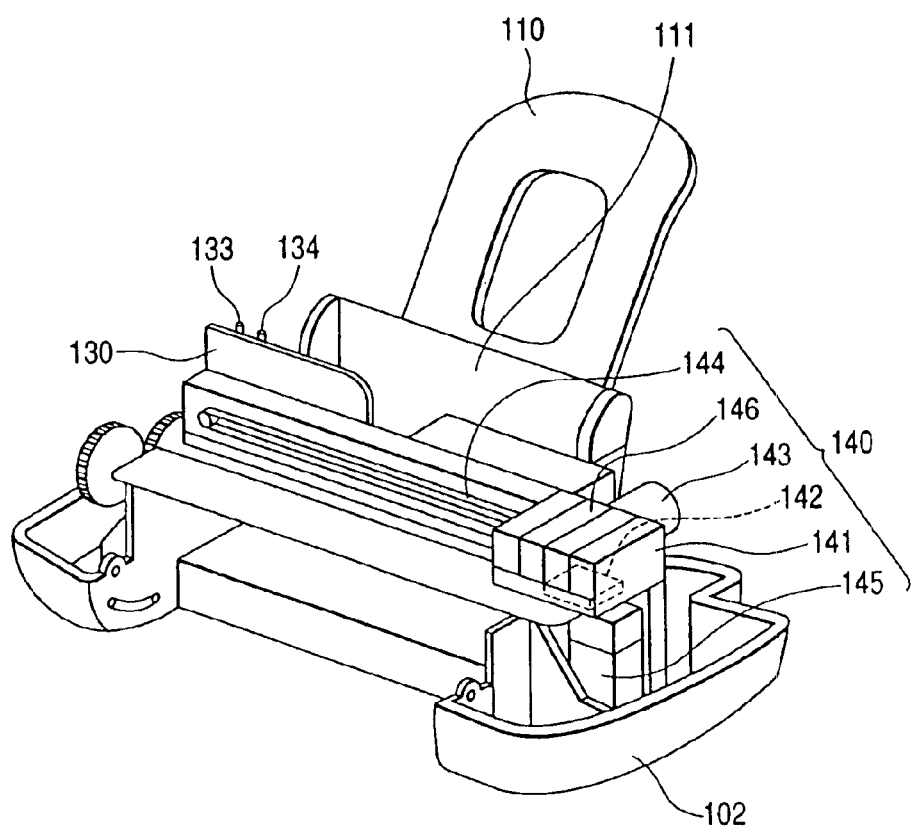
FIG. 3 is a perspective view of the whole of the internal structure of the ink jet printer in a state where an upper housing is removed.
Figure 4:
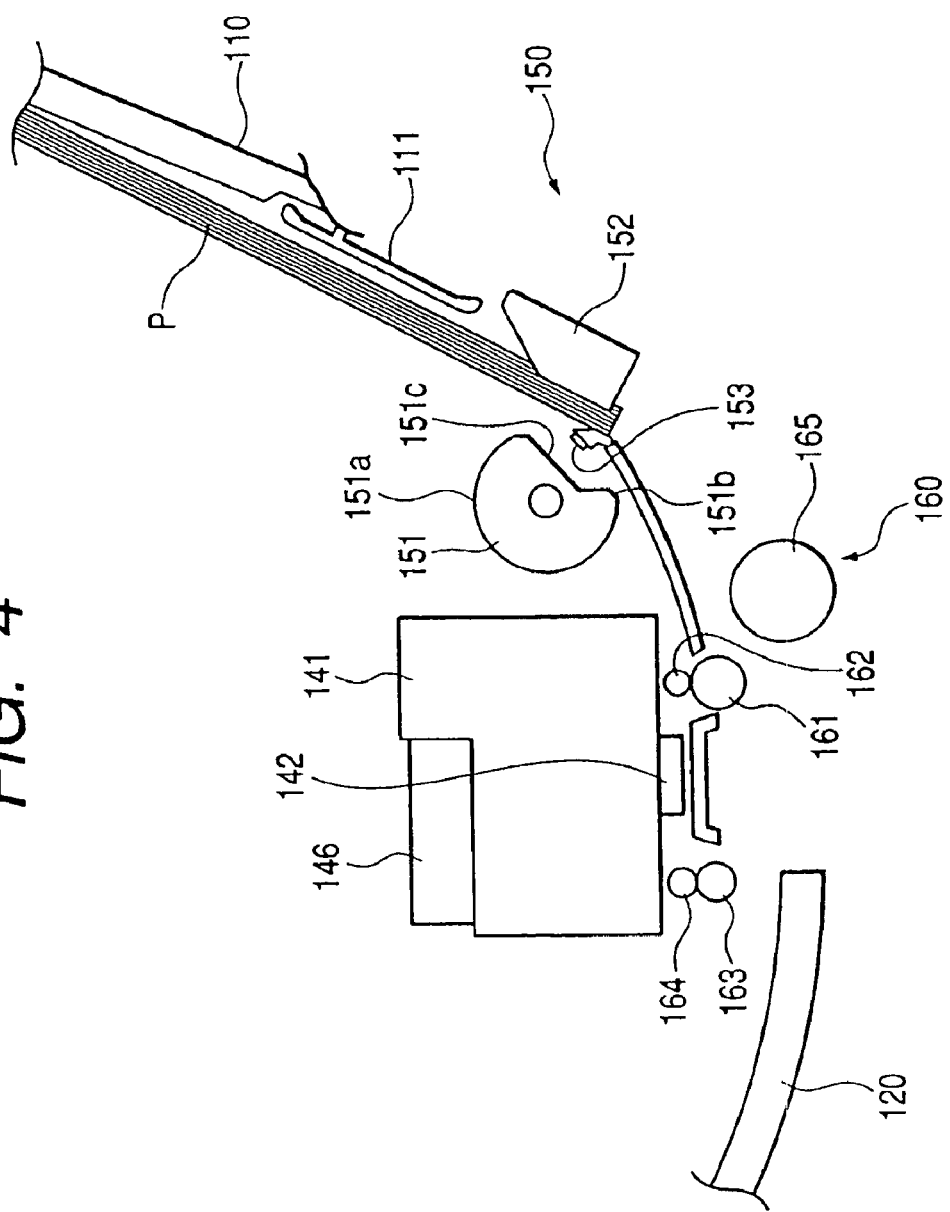
FIG. 4 is a sectional side view of an essential portion of the ink jet printer.

As shown in FIG. 3, in the lower housing 102, a control board 130 constituting a printer controller is placed vertically, and a recording section 140 constituting a print engine, a sheet feeder 150 and a transporter 160 shown in FIG. 4 are installed.

A control element and a memory element such as CPU, ROM, RAM, ASIC (they are not shown), and other various circuit elements are mounted on the control board 130. At the upper end of the control board 130, light emitting diodes 133 and 134 are located protrusively, which emit lights respectively when the power switch 131 or the operational switches 132, 133 are pushed on, whereby a user can confirm switch-ON.

The recording section 140 comprises a carriage 141, a recording head 142, a carriage motor 143, a timing belt 144, and a suction pump 145. On a sheet transported by the transporter 160, data is recorded by the recording head 142 mounted on the carriage 141 scanned by the carriage motor 143 and the timing belt 144. From ink cartridges 146 of four colors, for example, yellow, magenta, cyan, and black, housed in the carriage 141, each color ink is supplied to the recording head 142 so that full color printing can be performed.

The feeder 150 comprises the sheet feeding tray 110, a sheet feeding guide 111, a sheet feeding roller 151, a hopper 152, and a separation pad 153. Sheets P stacked on the sheet feeding tray 110 and aligned by the sheet feeding guide 111 are pushed against the sheet feeding roller 151 with the separation pad 153 by rising of the hopper 152 with rotation of the sheet feeding roller 151, separated one by one from the uppermost sheet P, and transported to the transporter 160.

The transporter 160 comprises a feeding roller 161, a driven roller 162, a discharging roller 163, a serrated roller 164, a sheet feeding motor 165, and the stacker 120. The sheet P supplied from the feeder 150 is transported to the recording section 140 while being held between the feeding roller 161 driven by the sheet feeding motor 165 and the driven roller 162, and further transported to the ejected sheet stacker 120 while being held between the discharging roller 163 driven by the sheet feeding motor 165 and the serrated roller 164.

Figure 5A:
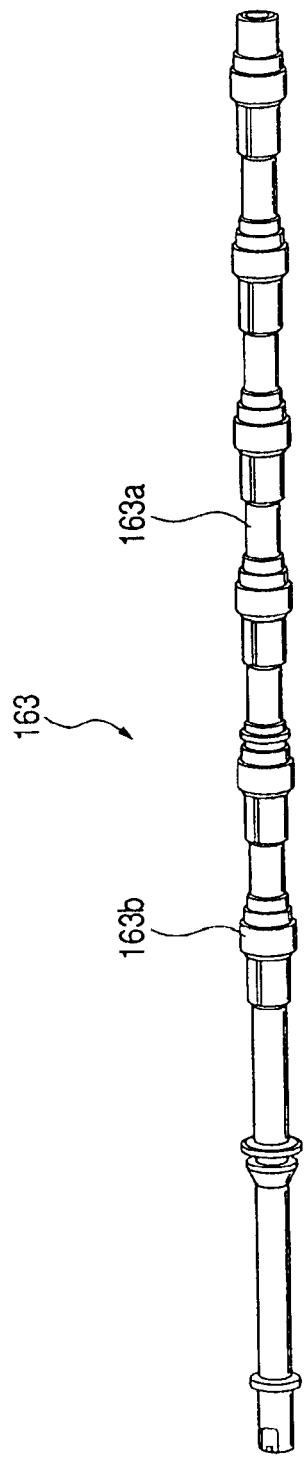
FIG. 5A is a perspective view showing a discharging roller in the ink jet printer.
Figure 5B:
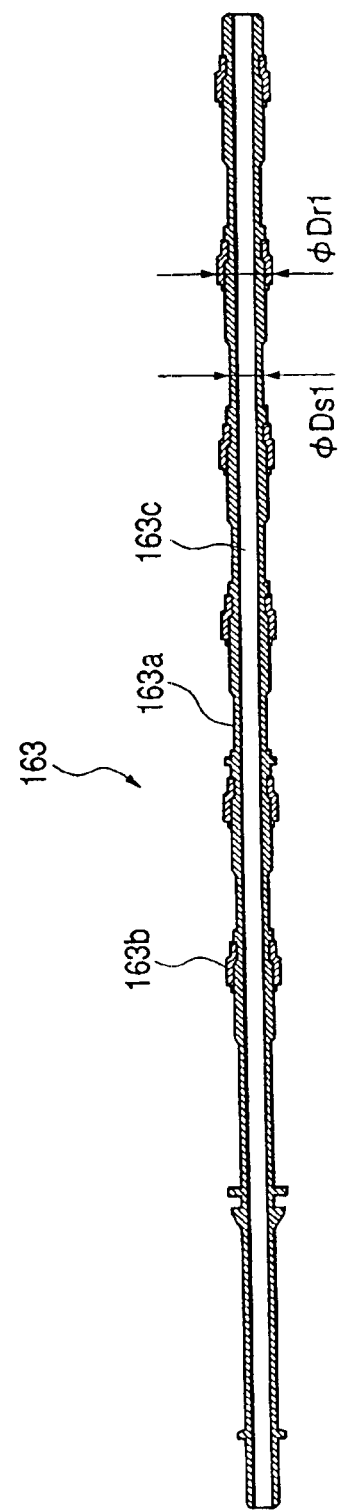
FIG. 5B is a section view of the discharging roller.

As shown in FIGS. 5A and 5B, the discharging roller 163 is formed so that a shaft portion 163a made of plastics elongates longer than at least recordable maximum sheet width and has a hollowed portion 163c extending axially. Further, plural roller portions 163b made of elastomer such as rubber are joined to the shaft portion 163a at a constant interval. The shaft portion 163a of the discharging roller 163 is molded by an injection method or a gas injection method which generates a void that can prevent a sink and a warp by suppressing internal stress produced when molding is performed using a die. The roller portion 163b of the discharging roller 163 is molded on the shaft portion 163a by an injection method.

Since the shaft portion 163a of the discharging roller 163 is thus formed in the hollowed shape having larger sectional area than sectional area of the related-art discharging roller 1, flexural rigidity of this discharging roller 163 can be enhanced more than that of the related-art discharging roller 1. Specifically, the diameter Dr1 (see FIG. 5B) is 11.26 mm and the diameter Ds1 is 8.25 mm. Therefore, the proportion of the outer diameter of the shaft portion to the outer diameter of the roller portion is 73.3%. Consequently, when the sheet is tensed between the discharging roller 163 and the feeding roller 161, deformation of the discharging roller 163 such as a flexure can be suppressed. Therefore, a flip phenomenon caused by the discharging roller 163 can be avoided, and particularly recording accuracy in recording on a whole surface can be improved.

As a material of the shaft portion 163a of the discharging roller 163, thermoplastic resin is used, for example, ABS (copolymer of acrylonitrile, butadiene and styrene), PS (polystrene), POM (polyacetal), modified PPE (polyphenylene ether), PC (polycarbonate), PBT (polybutylene terephthalate), and alloy system. Further, in order to heighten more the flexural rigidity, an additive such as GF (glass fiber), GB (glass beads), carbon, nylon, or potassium titanate is added. The amount of this additive is preferably 5 to 50% and particularly 10 to 30% in order to further enhance the flexural rigidity.

Figure 6:
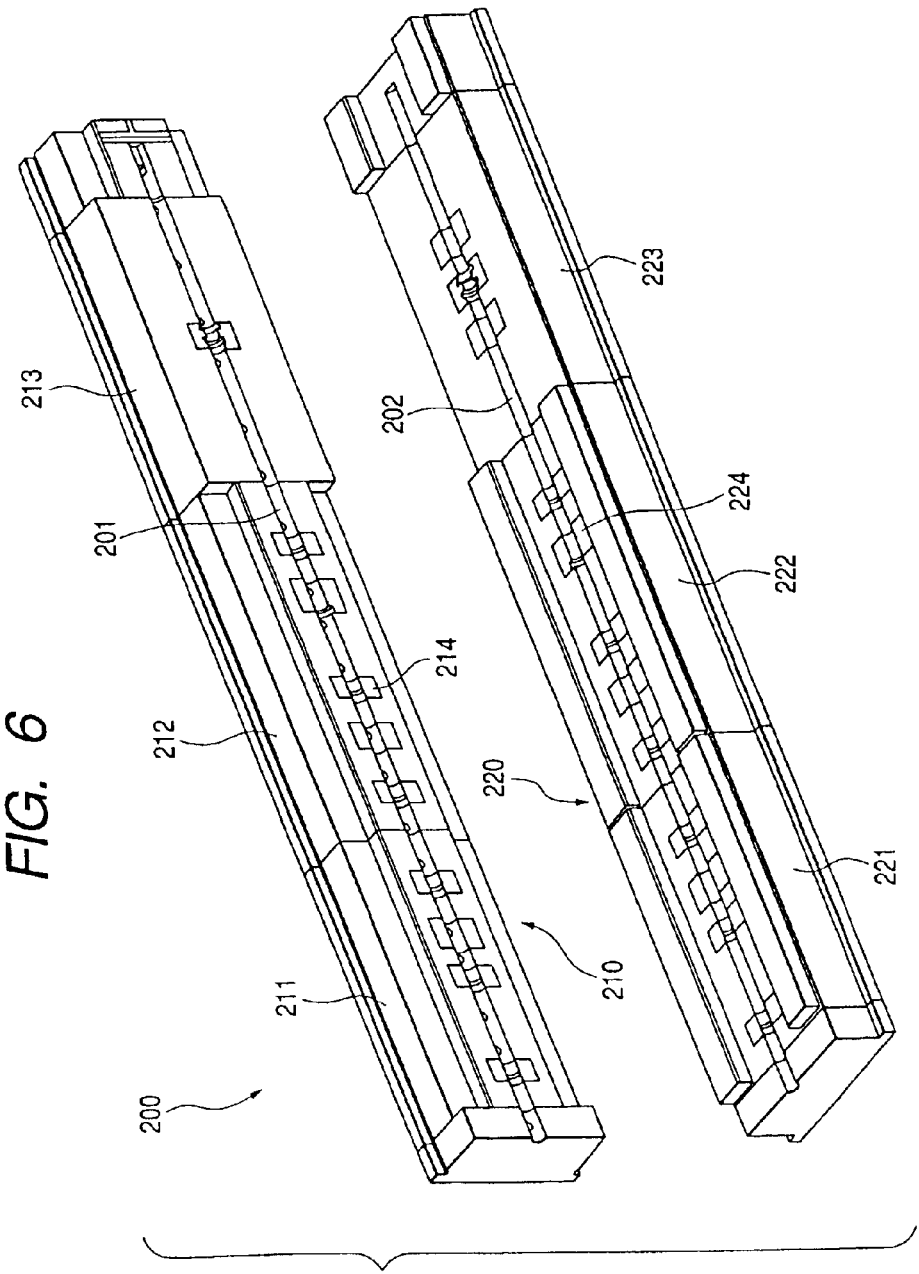
FIG. 6 is a perspective view showing an upper die and a lower die used in molding of the discharging roller, according to a first embodiment of the invention.

As shown in FIG. 6, in a die 200 used in molding of the shaft portion 163a of the discharging roller 163, according to a first embodiment of the invention, cavity portions 201 and 202 are formed in order to mold one shaft portion 163a of the discharging roller 163, and the die 200 comprises an upper die 210 and a lower die 220 that are divided in the radial direction of the discharging roller 163. Here, since the conventional shaft portion of the discharging roller, formed of metal is high in rigidity, distortion can be prevented by double point support structure in which both ends are supported. However, since the shaft portion 163a of the discharging roller 163 according to the invention is formed of plastics that is lower in rigidity than the metal, five point support structure in which not only the both ends but also intermediate portions are supported is adopted to prevent the distortion.

Since molding accuracy of each bore part in the shaft portion 163a of the discharging roller 163 affects greatly accuracy of rotation of the discharging roller 163, in order to improve the molding accuracy, the upper die 210 and the lower die 220 are respectively divided into three parts at portions where a part other than the bore portions is molded. In other words, each bore section including at least one bore portion is molded by a single die (a first upper die 211, a second upper die 212, a third upper die 213, a first lower die 221, a second lower die 222, and a third lower die 223) as shown in FIGS. 6, 7A and 7B.

Thus, through-work such as wire cut electrical discharge machining or cutting can be performed at the time of manufacturing the die, working accuracy of the die can be enhanced, and a die manufacturing cost can be reduced. Accordingly, the molding accuracy of the shaft portion 163a of the discharging roller 163 can be improved, and the eccentric rotation of the discharging roller 163 can be suppressed. Further, since the sectional shape of the shaft portion 163a of the discharging roller 163 is simplified, a cost of the discharging roller 163 can be reduced.

Figure 8A:
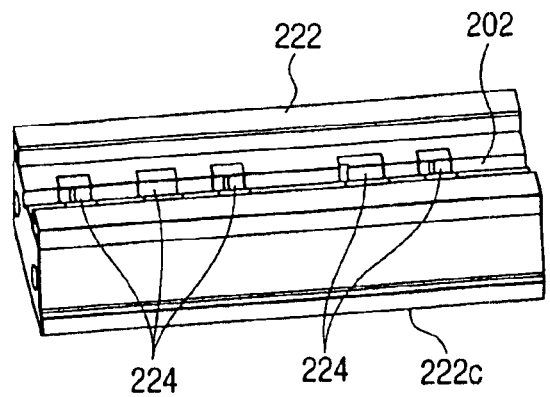
FIGS. 8A and 8B are perspective views showing the lower die.
Figure 8B:
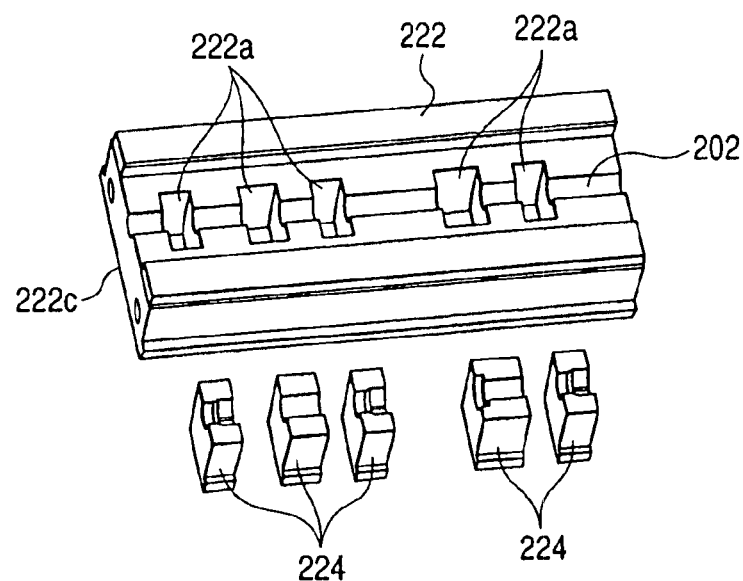

Due to limitation of a shape in the vicinity of each bore portion, there may be portions where the cavity portions 201 and 202 cannot be collectively formed. However, insert dies 214 and 224 are inserted into these portions to obtain desired shape of the cavity portions. FIGS. 8A and 8B are perspective views showing the second lower die 222 in detail. In this second lower die 222, five insert dies 224 are inserted. Each insert die 224, is inserted into a through hole 222a from a bottom face 222c side to constitute a part of the cavity portion 202. Though not shown, the first upper die 211, the second upper die 212, the third upper die 213, the first lower die 221, the third lower die 223 have also the similar structure.

Figure 9:
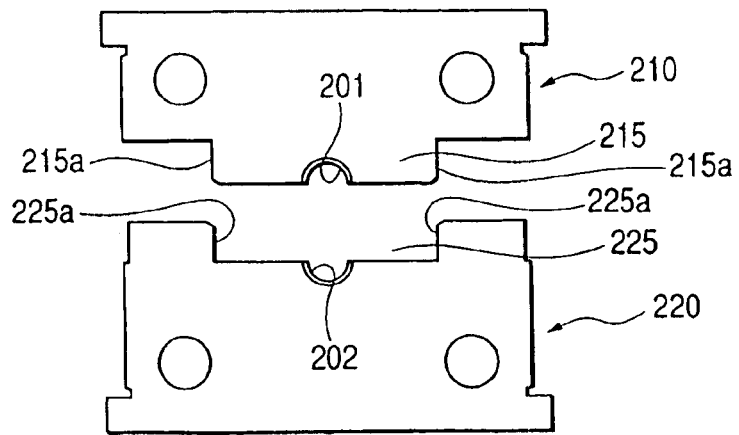
FIG. 9 is a side view showing a fitting part of the upper die and the lower die.

As shown in FIG. 9, a fitting part 215 of the upper die 210 and a fitting part 225 of the lower die 220 are formed in the shapes of concave and convex that can be fitted to each other, and lower corners 215a of the upper fitting part 215 and the upper corners 225a of the lower fitting part 225 are tapered so as to facilitate the fitting operation.

Since the cavity portion 201 in the upper die 210 and the cavity portion 202 in the lower die 220 can be faced with each other with high accuracy, occurrence of flash extending in the axial direction of the periphery of the shaft portion 163a can be suppressed and the molding accuracy can be improved, so that the eccentric rotation of the discharging roller 163 can be suppressed.

Figure 10A:
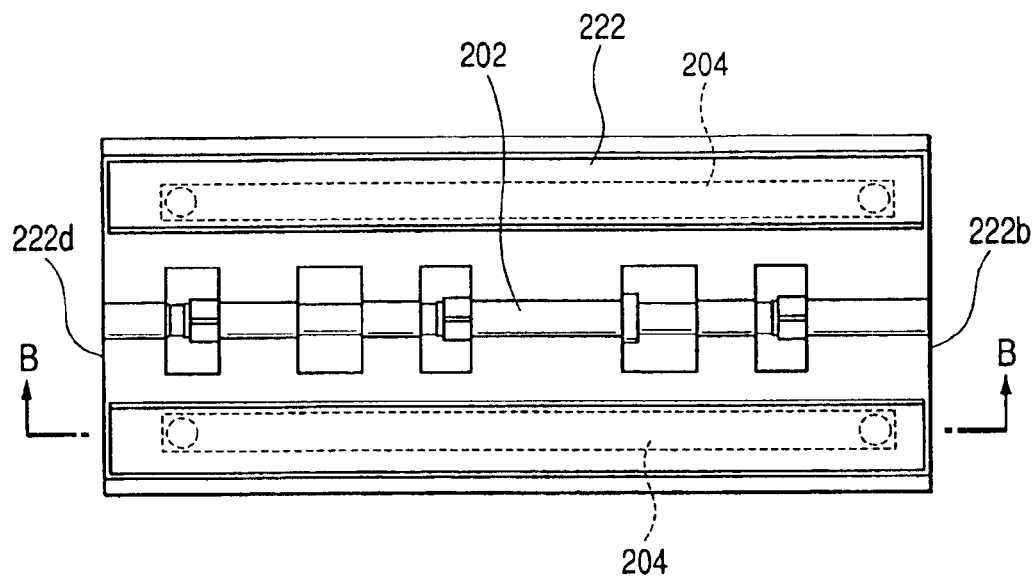
FIG. 10A is a plan view of the lower die, showing a fluid passage for cooling liquid.
Figure 10B:
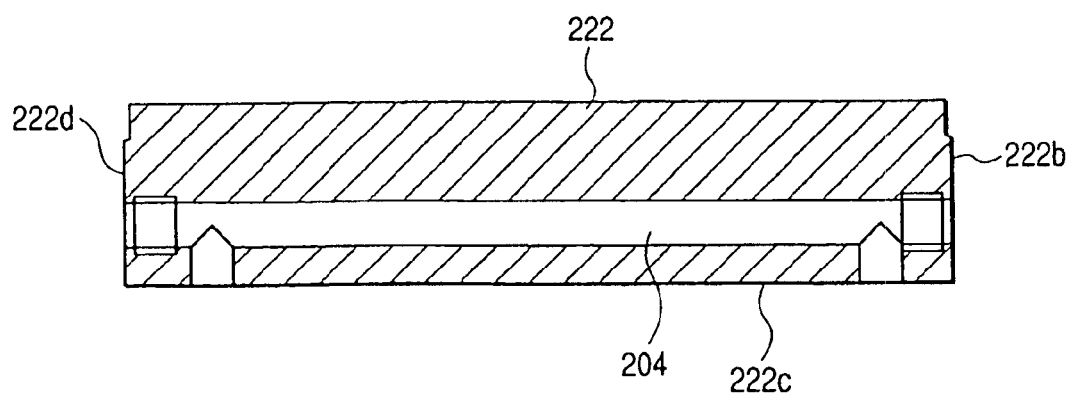
FIG. 10B is a section view taken along the line B—B in FIG. 10A.

As shown in FIGS. 10A and 10B, the cavity portions 201 and 202 are heat-regulated. Inside of this second lower die 222, a fluid passage 204 through which cooling liquid (e.g., water) for heat regulation of the cavity portion 202 flows is formed. As shown in FIG. 10B, the fluid passage 204 extends perpendicularly from a bottom face 222c at one end face 222b side, it turns at a nearly right angle, extends from one end face 222b side to the other end face 222d side, and thereafter turns at a nearly right angle to run through the bottom face 222c at the other end face 222 side. Such the fluid passages 204, as shown in FIG. 10A, are formed respectively on both widthwise sides of the cavity portion 202. Though not shown, the similar fluid passages are formed in the first lower die 221 and the third lower die 223.

Figure 11:
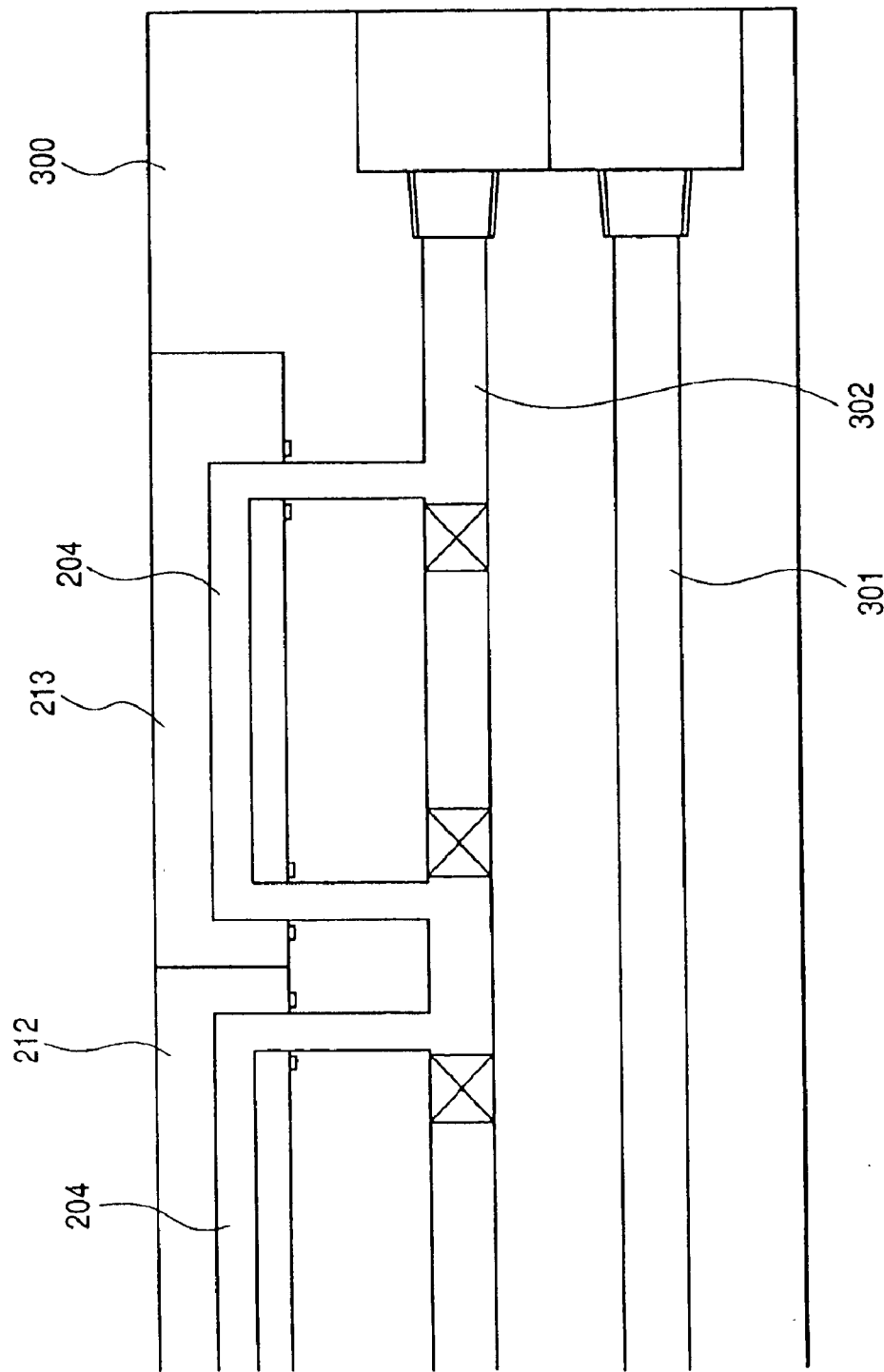
FIG. 11 is a section view of an injection molding machine incorporating the dies.

FIG. 11 is a section view showing a state where the die 200 is attached to a die attaching portion 300 of an injection molding machine. In the die attaching portion 300 of the injection molding machine, a fluid passage 301 through which cooling liquid (e.g., water) for heat-regulating the die attaching portion 300 itself flows is formed. Moreover, a fluid passage 302 through which cooling liquid for heat-regulating the cavity portions 201, 202 is formed so as to communicate to the fluid passage 204 of the die 200.

Hereby, since the inner surfaces of the cavity portions 201, 202 can be cooled, when the melted plastic is injected, the outer surface of plastic is solidified in a state where it is adhered onto the inner surfaces of the cavity portions 201, 202, and void is easy to be produced on the inside thereof. Therefore, occurrence of internal stress of molded products for the shaft portion 163a can be suppressed, so that a sink and a warp can be prevented. Further, dimensional accuracy of outer diameter of the shaft portion 163a can be improved, so that the eccentric rotation of the discharging roller 163 can be suppressed. Further, since the die 200 is cooled relatively quickly, an operation cycle for molding can be reduced.

Figure 12:
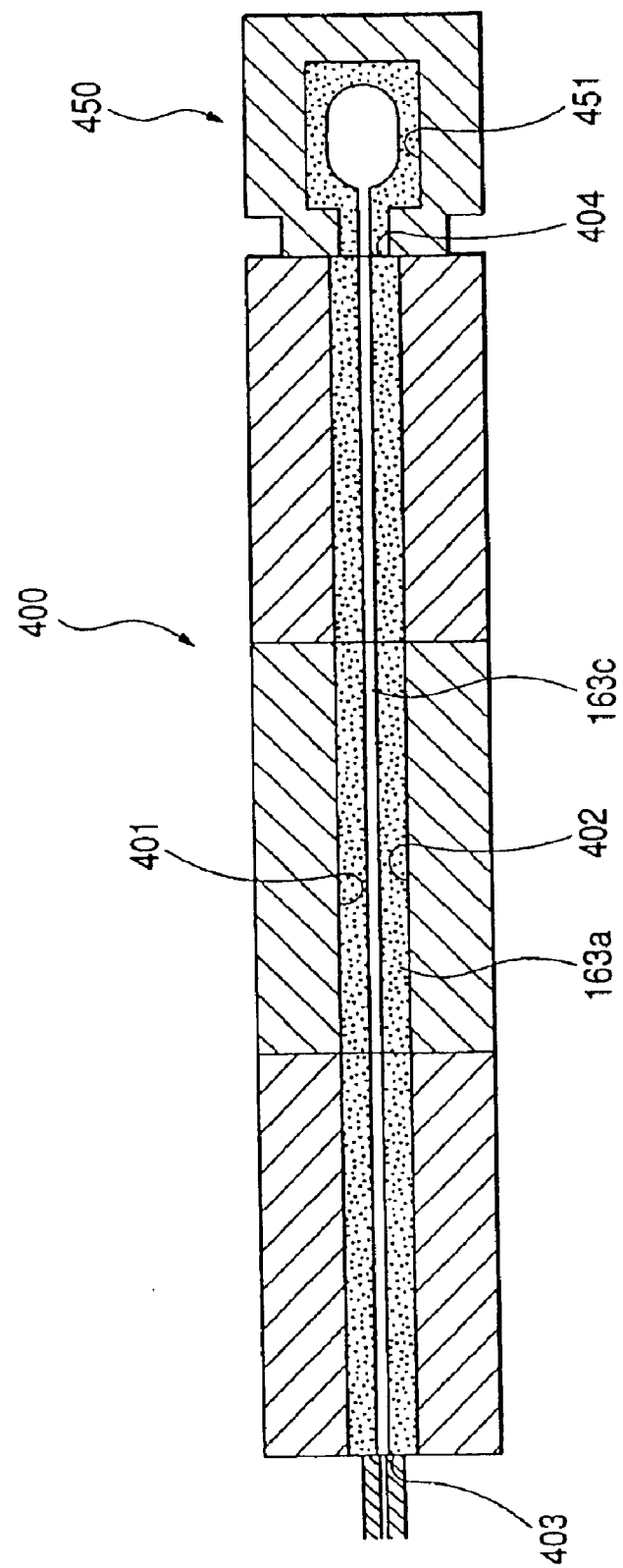
FIG. 12 is a section view showing a die used in molding of the discharging roller with a gas injection method, according to a second embodiment of the invention.
Figure 13A:
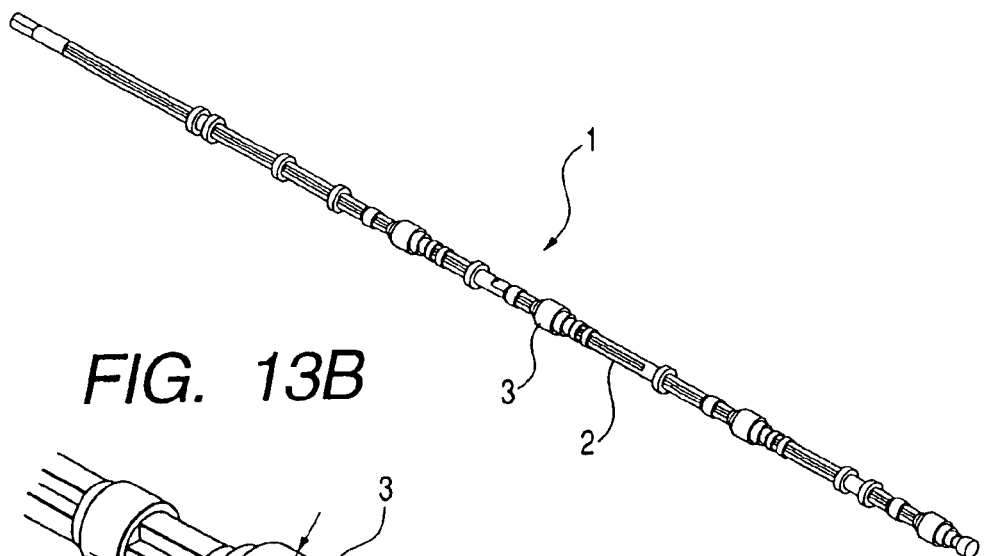
FIG. 13A is a perspective view showing a first related-art discharging roller.
Figure 13B:
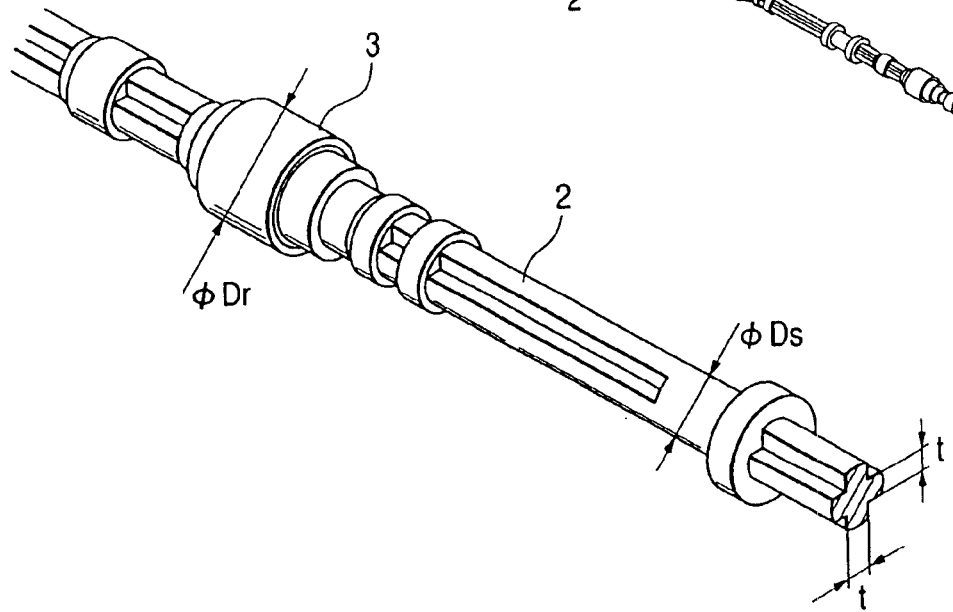
FIG. 13B is an enlarged perspective view of the first related-art discharging roller.
Figure 14:
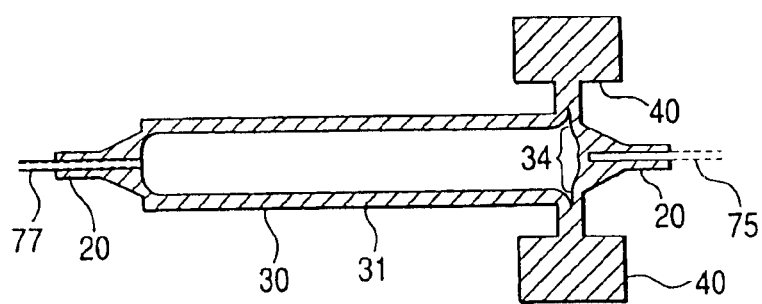
FIG. 14 is a section view showing a die used in molding of a second related-art discharging roller with a gas injection method.

Further, as the injection method, a gas injection method can be adopted. FIG. 12 shows this configuration as a second embodiment of the invention. To a die attaching portion of an injection molding machine of this embodiment, a die 400 and a die 450 are attached. The die 400 has the similar structure as the die 200, in which cavity portions 401, 402 for molding one shaft portion 163a of a discharging roller 163 are formed. An auxiliary cavity 451 is attached to an exhaust port 404.

Under a condition that the cavity portions 401, 402 of the die 400 are heat regulated at a predetermined temperature, the predetermined amount of the melted plastic is injected from an injection port 403 of the die 400. Subsequently, the predetermined amount of gas is injected from the injection port of the die 400. Hereby, a plastic outer surface coming into contact with the inner surfaces of the cavity portions 401, 402 is quickly cooled and pressed by gas pressure from the plastic inside. Therefore, the plastic is solidified in a state where it is adhered onto the inner surfaces of the cavity portions 401, 402.

Melting plastic inside the plastic between the injection port 403 of the die 400 and the exhaust port 404 is pushed out from the exhaust port 404 by gas and fed out into the auxiliary cavity 451. Hereby, occurrence of internal stress of molded products for the shaft portion 163a of the discharging roller 163 can be suppressed, so that the sink and the warp can be prevented. Further, the dimensional accuracy of outer diameter of the shaft portion 163a can be improved, and a uniform hollowed portion 163c can be formed stably in the shaft portion 163a throughout the entire region in the axial direction. Therefore, the eccentric rotation of the discharging roller 163 can be suppressed.

Though the invention has been described in the above various embodiments, it is not limited the above embodiments but may be applied also to other embodiments within the scope of the appended claims. For example, though the ink jet printer has been described as an example of a recording apparatus, the invention is not limited to this but can be applied to another recording apparatus having a discharging roller, for example, a thermal transfer type printer, and an ink jet type or thermal transfer type facsimile or copying machine.

What is claimed is:

1. A die for molding a discharging roller which discharges a recording medium from a recording apparatus, the die comprising:
    a first die, formed with a first recess extending in an axial direction of a shaft portion of the discharging roller; and
    a second die, formed with a second recess extending in the axial direction, the second die combined with the first die such that the first recess and the second recess face to form a continuous cavity for molding a bore portion of the shaft portion.

2. The die as set forth in claim 1, wherein the first recess is formed on a bottom face of a recessed portion of the first die, and the second recess is formed on a convex portion of the second die which is fitted into the recessed portion.

3. The die as set forth in claim 2, wherein an entrance corner of the recessed portion and a corner portion opposing to the entrance corner are tapered.

4. The die as set forth in claim 1, wherein at least one of the first die and the second die is formed with a fluid passage through which a fluid for cooling the cavity flows.

5. A discharging roller, molded by the die as set forth in claim 1.

6. A recording apparatus comprising the discharging roller set forth in claim 5.

* * * * *